United States Patent [15] 3,684,962

Hottel, Jr. [45] Aug. 15, 1972

[54] RETRANSMITTING SYSTEM FOR USE IN LOCATING REMOTE SIGNALS

[72] Inventor: Hoyt C. Hottel, Jr., Mattapoisett, Mass.

[73] Assignee: The Sippican Corporation, Marion, Mass.

[22] Filed: Sept. 25, 1970

[21] Appl. No.: 75,536

[52] U.S. Cl. ..........................325/9, 325/13, 325/64, 325/113, 325/159, 343/6.5 R, 343/6.8 R, 343/103

[51] Int. Cl. .............................H04g 7/14, G01s 1/24

[58] Field of Search..............325/9, 13, 64, 113, 159; 343/6.5 R, 6.8 R, 103

[56] References Cited

UNITED STATES PATENTS 2,561,363 7/1951 Haeff et al. ..............325/13 X

*Primary Examiner*—T. H. Tubbesing
*Attorney*—Robert E. Hillman

[57] ABSTRACT

Non-distorting retransmission of the navigational signals from the object to be located to a remote signal-processing station, with apparatus comprising an antenna located at the object to initially receive the navigational signals; a linear radio frequency amplifier connected to the antenna to amplify the received signals; a source of radio frequency signals at a telemetry frequency; a controllable gain amplifier connected to receive the telemetry frequency signals; a differential amplifier having its output connected to the gain control terminal of the controllable gain amplifier and having its inputs respectively responsive to the outputs of the other two amplifiers to effectively compare their outputs and provide a voltage at the gain control terminal in accordance with any difference therebetween, whereby the telemetry frequency signals are modulated in accordance with the received navigational signals; a transmitting antenna connected to transmit the modulated signals to the processing station; and a converter at the processing station to convert the modulated signals to the frequency band of the original navigational signals.

3 Claims, 4 Drawing Figures

FIG I

RETRANSMITTING SYSTEM FOR USE IN LOCATING REMOTE SIGNALS

This invention relates to the use of radio frequency signals to determine the position of a remote object.

Objects of the invention are to facilitate the use of conventional radio frequency navigational signals (e.g., Loran) to accurately position objects remote from the signal-processing receiver, with inexpensive and reliable apparatus that can be easily interfaced with a variety of systems and is useful without signal distortion over a large dynamic range.

In general, the invention features non-distorting retransmission of the navigational signals from the object to be located to a remote signal-processing station, with apparatus comprising an antenna located at the object to initially receive the navigational signals; a linear radio frequency amplifier connected to the antenna to amplify the received signals; a source of radio frequency signals at a telemetry frequency; a controllable gain amplifier connected to receive the telemetry frequency signals; a differential amplifier having its output connected to the gain control terminal of the controllable gain amplifier and having its inputs respectively responsive to the outputs of the other two amplifiers to effectively compare their outputs and provide a voltage at the gain control terminal in accordance with any difference therebetween, whereby the telemetry frequency signals are modulated in accordance with the received navigational signals; a transmitting antenna connected to transmit the modulated signals to the processing station; and a converter at the processing station to convert the modulated signals to the frequency band of the original navigational signals. In preferred embodiments automatic gain control circuitry is responsive to the output of the linear amplifier to narrow the dynamic range of that output, the gain control circuitry operating more slowly than the repetition rate of the navigational signals, to avoid distortion within a single burst of navigational signals; and the source of telemetry frequency signals is a crystal oscillator.

Other objects, features, and advantages will appear from the following description of a preferred embodiment taken together with the attached drawings in which.

Figure 1:
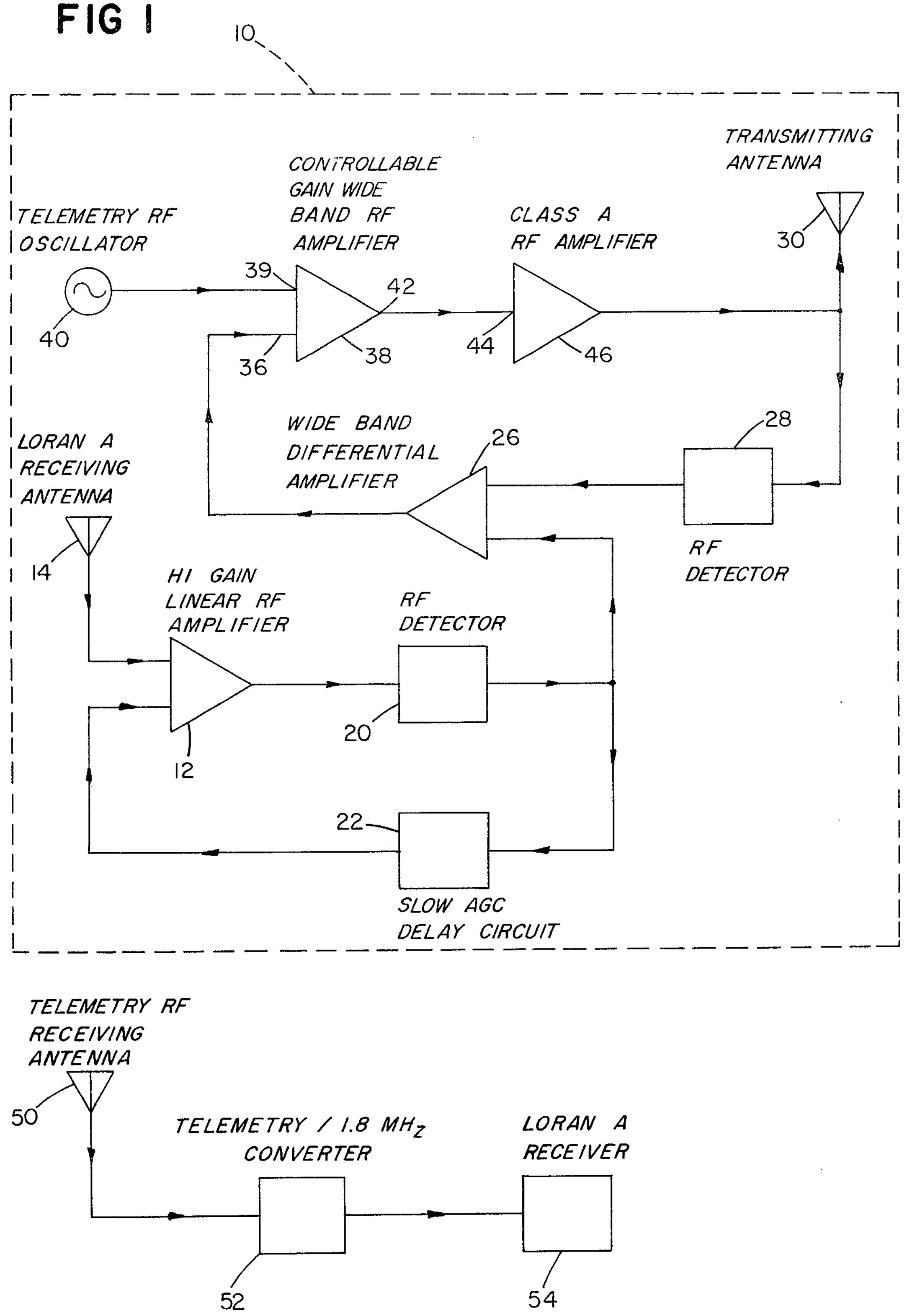
FIG. 1 is a block diagram of the invention.
Figure 4:
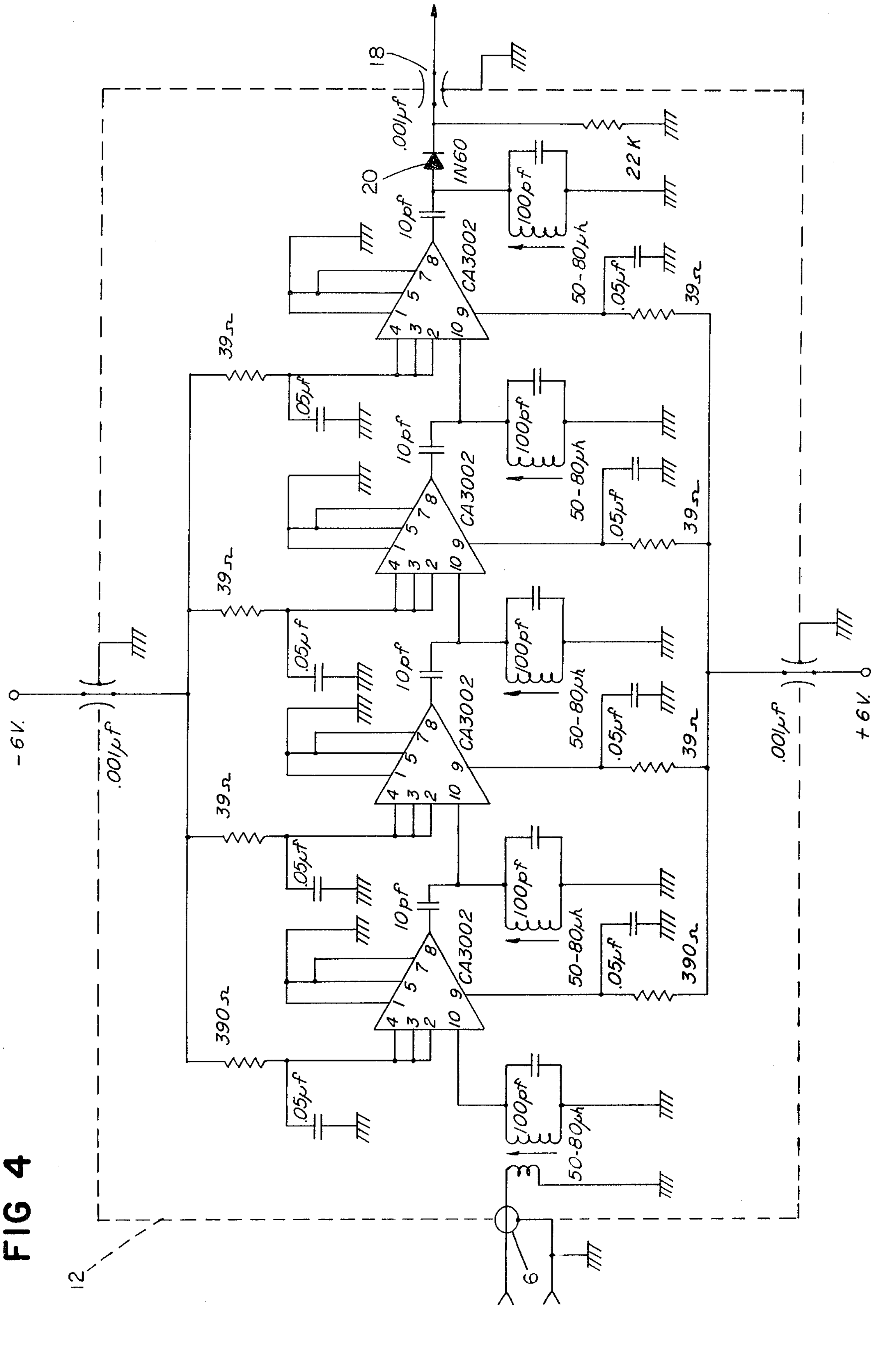

Referring to the drawings, a radio receiving and retransmitting unit 10 is carried by the object to be position monitored, and is in this example adapted for use with the Loran A navigational system. A high gain linear RF amplifier 12 receives the bursts of Loran signals (e.g., at 1.8 $MH_z$) through antenna 14. Amplifier 12 consists essentially of four CA 3002 (RCA) integrated circuits wired as shown in FIG. 4. The Loran signals are received through coaxial input 16, and the amplified output appears through feed-through capacitor 18. Although not shown in FIG. 4, a portion of the signal from diode 20 (which acts as an RF detector) is preferably fed through a slow (e.g., 1000 times slower than the repetition rates of the Loran master and slave stations) conventional automatic gain control delay circuit 22 (FIG. 1), to control the gain of amplifier 12, so that the output of unit 10 will remain within the dynamic range of the shore based equipment, despite the large variations in dynamic range in the signals which must be received and transmitted without distortion by unit 10.

Figure 2:
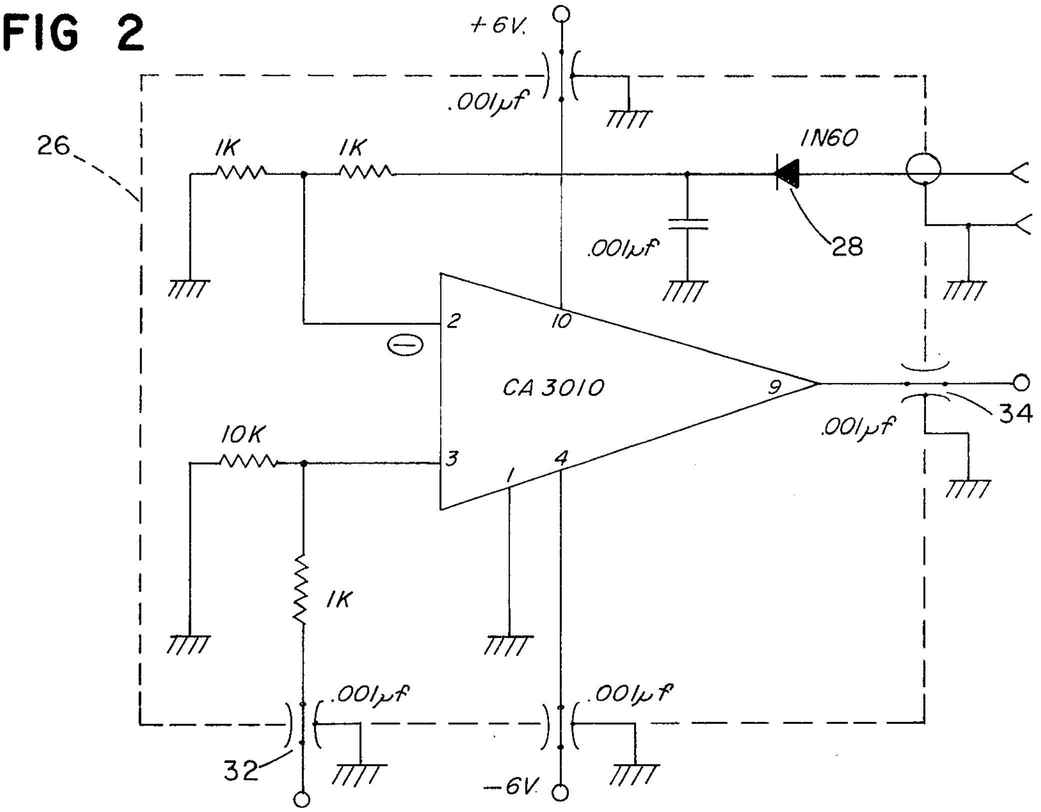
FIGS. 2–4 are schematic diagrams of components of the system of FIG. 1.

The amplified Loran signals pass to one input of wide band differential amplifier 26, the other input of which is connected through RF detector 28 to receive a portion of the signal to be transmitted by antenna 30. The details of amplifier 26, which includes a CA 3010 (RCA) integrated circuit, are shown in FIG. 2. The originally amplified Loran signals enter through feed through capacitor 32, are compared with the signals from detector 28, and an output voltage proportional to any difference in the inputs passes through capacitor 34 to the gain control terminal 36 of wide band RF amplifier 38.

Figure 3:
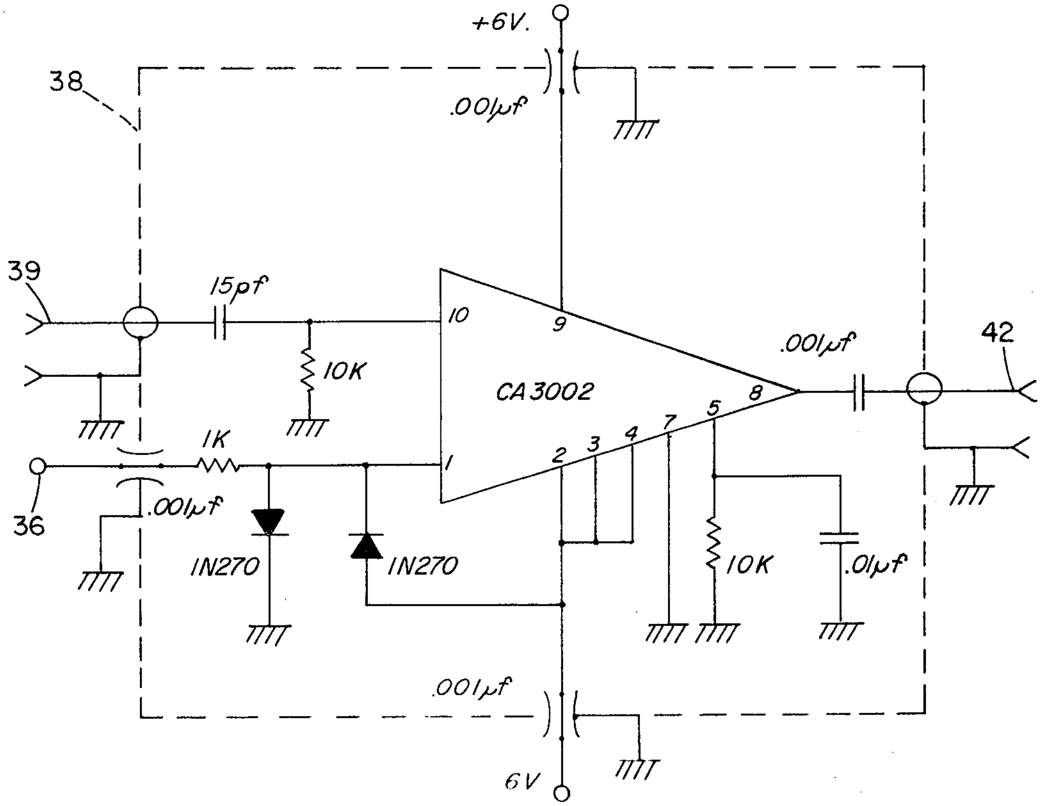

Amplifier 38 consists essentially of a CA 3002 (RCA) integrated circuit wired as shown in FIG. 3, and receives at terminal 39 a telemetry frequency RF signal from crystal oscillator 40, which is modulated by the voltage received at terminal 36 to produce at terminal 42 an RF signal upon which is superimposed without distortion the envelope of the received Loran signals.

Terminal 42 is connected to input 44 of class A RF amplifier 46, the output of which is fed to antenna 30.

The transmission from antenna 30 is received through shore based antenna 50 by conventional converter 52, which converts the modulated telemetry signal back to 1.8 $MH_z$, so that Loran A receiver 54 can process the Loran signals in the usual manner by measuring the time delay between receipt of the master and slave pulses. Highly accurate measurement is ensured by the completely linear manner in which the Loran signals are treated by unit 10.

Other embodiments will occur to those skilled in the art and are within the following claims.

What is claimed is:

1. Apparatus for receiving radio frequency signals at an object to be located, retransmitting said signals from said object to a remote signal-processing station, and converting said signals at said station into a form processable to locate said object, comprising an antenna at said object for receiving said signals, a linear radio frequency amplifier connected to said antenna for amplifying the received signals, a source of radio frequency signals at a telemetry frequency, a controllable gain amplifier connected to receive said telemetry frequency signals, a differential amplifier having its output connected to the gain control terminal of said controllable gain amplifier and having inputs respectively responsive to the outputs of said linear and controllable gain amplifiers to effectively compare said last mentioned outputs and provide a voltage at said terminal in accordance with any difference therebetween, whereby said telemetry frequency signals are modulated in accordance with said received signals, a transmitting antenna connected to transmit the modulated signals to said station, and a converter at said station to convert said modulated signals to the frequency band of said received signals.

2. The apparatus of claim 1 for use with radio frequency signals having a repetition rate, further comprising automatic gain control circuitry responsive to the output of said linear amplifier to narrow the dynamic range of said output, said circuitry being operative to vary the gain of said linear amplifier at a rate slower than said repetition rate, to avoid distortion within a single burst of said received signals.

3. The apparatus of claim 1 wherein said source comprises a crystal oscillator.

* * * * *